July 29, 1947.  F. A. JENKS  2,424,570
CROSS POINTER METER
Filed May 26, 1943
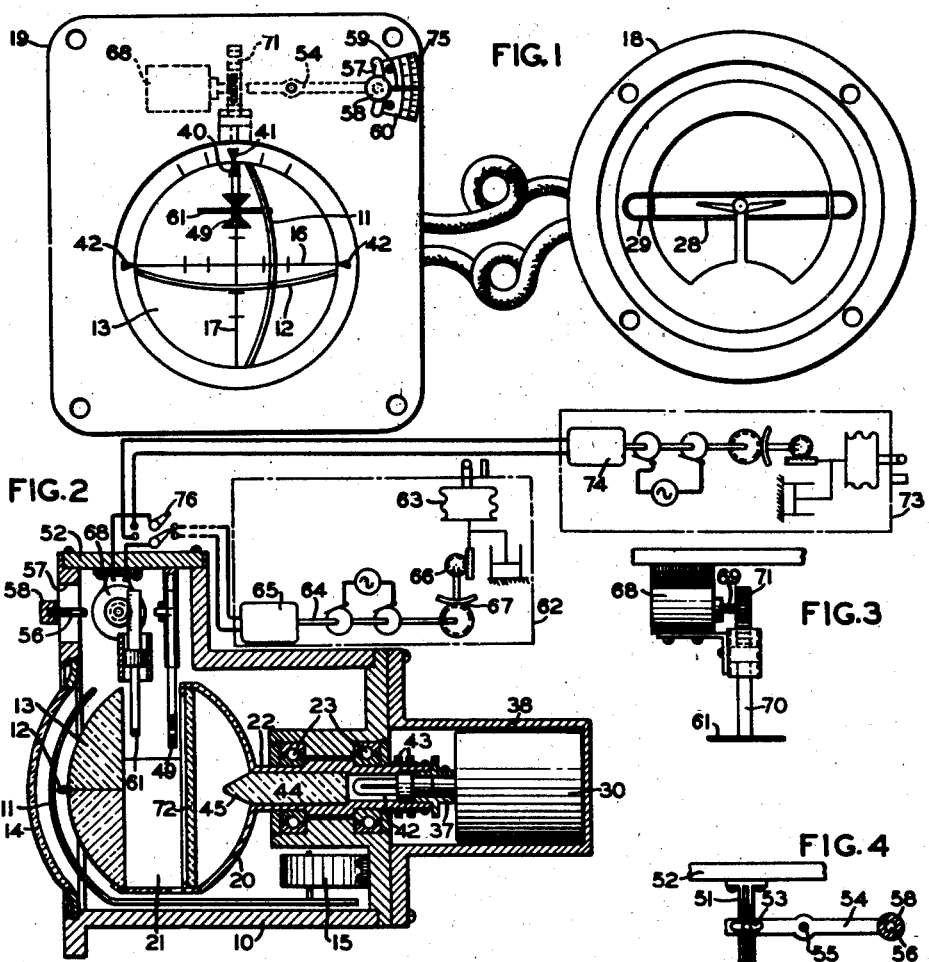
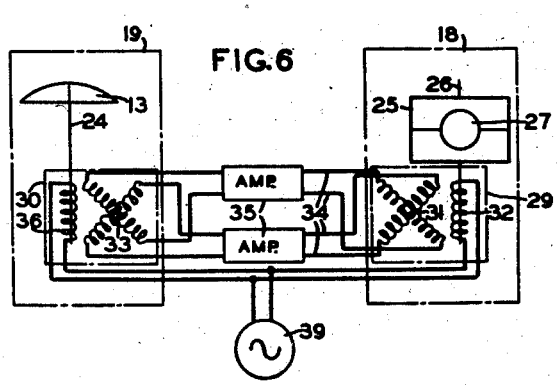
INVENTOR
F. A. JENKS
BY
ATTORNEY.

Patented July 29, 1947

2,424,570

UNITED STATES PATENT OFFICE 2,424,570

CROSS POINTER METER

Frederic A. Jenks, Rockville Centre, N. Y., assignor to Sperry Gyroscope Company, Inc., a corporation of New York Application May 26, 1943, Serial No. 488,618

13 Claims. (Cl. 177—311)

This invention relates to cross pointer meters that are particularly useful in the navigation and instrument landing of dirigible craft. Such a meter provides an up-down and right-left indication of the deviation or displacement of the craft from a desired path by means of crossed pointers, one of which is normally horizontal and the other of which is normally vertical.

One of the objects of the invention is to provide an instrument of this character, which obviates the possibility of misinterpretation of the movement of the horizontal pointer as an indication that the craft is banking.

A feature of the invention is to provide for stabilization of the reference member of the meter to prevent movement of the same as the craft moves about its roll axis.

Another object of the invention is to construct a meter of this character that simultaneously enables the observer to obtain an indication of the attitude of the craft with reference to the roll axis thereof.

A further feature of the invention resides in the incorporation in the meter of a means facilitating the control of the air speed of the craft.

Other objects, features and structural details of the invention will be apparent from the following description when read in relation to the accompanying drawing, wherein Fig. 1 is a front elevation of the improved meter and a similar view of a conventional artificial horizon;

Fig. 2 is a vertical cross-section of the meter instrument shown in Fig. 1, with a diagrammatic view of an air speed responsive controller and the rate of climb controller utilized therewith;

Fig. 3 is a detail elevation view of the mechanism in the meter responsive to the air speed and rate of climb controllers;

Fig. 4 is a view similar to Fig. 3 showing the index member in detail, for the reference piece on the mechanism moved responsive to the air speed and rate of climb controllers;

Fig. 5 is an enlarged detail front view showing a modified form of the cross pointers; and Fig. 6 is a circuit diagram and schematic view showing the relation of the instruments illustrated in Fig. 1.

With reference particularly to Figs. 1, 2 and 6, a cross pointer meter 19 constructed in accordance with the present invention includes a housing 10 for the moving parts of the instrument which are provided by the crossed pointers 11 and 12 and a background element 13. A window 14 in the front of the housing permits an observer to see the position of the crossed pointers relative to the element 13. A magnet and coil combination is provided to position each of the movable pointers, only the combination 15 for pointer 11 being shown in Fig. 2, in this instance. The magnet and coil combination, which are not illustrated in detail may be of the character particularly shown and described in connection with the D'Arsonval meter illustrated in Fig. 10–1 on page 354 of volume 1 of the book by John H. Morecroft and Frederick W. Hehre entitled, "Electrical Circuits and Machinery," published in 1933 by John Wiley and Sons, Incorporated. The pointers are deflected in accordance with the strength of an applied electrical signal by the spring and coil actuating means which functions as a spring-opposed electromagnetic motor. The signal controlling the pointers may originate in a radio navigation control system (not shown) of the character described and illustrated in U. S. Letters Patent No. 2,395,854, to T. M. Ferrill, Jr. The background element 13 employed is generally similar in character to the one shown in the above noted patent and includes thereon a horizontal reference line 16 and a vertical reference line 17. Pointer 12 in connection with line 16 indicates up-down displacement of the craft from a given path. Also, pointer 11 in connection with line 17 indicates right-left displacement of the craft from the path. Lines 16 and 17 on the element 13 provide a reference scale on which the position of the intersecting portion of the two pointers is observed. As shown, the element 13 may be spherically shaped, the pointers may be arcuately shaped and the lines 16 and 17 on the element 13 may be graduated to provide an indication of the degree of displacement of the craft from the path.

In accordance with the teaching of the present invention the element 13 may be mounted for pivotal movement with respect to the housing 10 as the craft turns or moves about its roll axis. To provide stabilization of the element 13 of the meter with reference to the roll axis of the craft on which it is mounted, I employ, in this instance, a gyro vertical in the form of an artificial horizon generally indicated at 18.

As shown in Fig. 2, element 13 is connected to a reflector 20 by means of a curved holding plate 21. Reflector 20 is provided with a hollow projecting end sleeve 22 that is pivotally mounted within the housing 10 by means of bearings 23. It will be understood that the provided axis of movement of the element 13 is situated in parallel or aligned relation to the fore and aft axis of the craft in which the meter is mounted. This axis is indicated generally at 24 in Fig. 6.

As shown in Fig. 6, the conventional artificial horizon 18 may include a pivotally mounted gimbal ring 25 whose axis 26 is parallel to axis 24. A gyro rotor bearing case 27 is mounted for pivotal movement in the usual fashion in ring 25. As well understood in the art, if the craft banks about its roll axis, movement thereof with reference to axes 26 and 24 results, and in the artificial horizon instrument 18 a bank indication is provided by relative angular displacement between the reference 28 of the horizon and its associated index 29, Fig. 1. The means provided, in the present instance, to stabilize the element 13 is the gyro vertical of the artificial horizon 18, and a self-synchronous position repeating system linking the same with the meter and including a selsyn transmitter 29 and a selsyn receiver 30. The stator 31 of the selsyn transmitter 29 is situated at the gyro vertical and the rotor 32 thereof is positioned relatively to the stator 31 by a connection of the same to the gimbal ring 25. Stator 33 of the receiver 30 positioned in the instrument 19 is connected to receive the output signal of the transmitter 29 by way of of leads 34 through the amplifiers 35. Rotor 36 of the receiver 30 is connected to the sleeve 22 by a coupling 37, Fig. 2. As shown in Fig. 2, the selsyn receiver 30 is fixedly mounted in a casing 38 forming an extension at the rear of the meter instrument housing 10. The rotors 32 and 36 of the connected selsyn devices are supplied with energy from a common source of alternating current generally indicated at 39. The electrical system shown functions as a position repeating device that stabilizes the element 13, the transmitter thereof being situated at the roll axis of the gyro vertical and the receiver thereof being situated at the axis of the element 13.

Heretofore when making instrument landings with a cross pointer meter, the sense of bank of the craft was supplied by an auxiliary instrument such as an artificial horizon or bank-turn indicator. This information had to be obtained by occasional glances at the auxiliary instrument, thereby causing the pilot's attention to be momentarily removed from the cross pointer meter. This requirement is distinctly disadvantageous, particularly when the craft is in the final stages of landing. With the improved meter a bank sense is obtained directly from the orientation of the element 13 in the instrument landing cross pointer meter so that it is unnecessary for the pilot to divert his attention from the single instrument at any stage in the landing of the craft. In this connection, the background element 13 of the meter provides a bank indicating index 40 thereon which cooperates with a reference 41 located on the housing or casing of the instrument.

In accordance with the teaching of the present invention, a further bank indication of the craft may be provided by the spaced references 42 fixed on the housing and by the line 16 of the cross pointer meter. In the present instance, the hemispherical background element 13 is constructed in two equal sections of different degrees of transparency to define the bank index line 16 thereon. The portion of the element 13 above line 16 may be of a light amber transparent material while that below the line may be a dark amber transparent material. With illumination supplied to the element 13 from the rear, the upper portion thereof simulates the sky and the lower portion simulates the earth so that when the craft banks, the meter will apparently indicate such condition relative to the earth instead of an artificial line. Means for illuminating the element 13 is provided by a lamp 42 situated within the sleeve 22 and supplied with energy from a suitable source (not shown) by way of slip rings 43. Light from the lamp 42 is communicated to the reflector 20 by way of a light guiding rod 44 fitting in the sleeve 22 whose end is shaped to provide uniform illumination of the reflector 20, as indicated at 45.

With an illuminated type of element 13, the cross pointers 11 and 12 may be formed of polarized material arranged to provide an opaque intersection as indicated in Fig. 1. In the modification of the invention shown in Fig. 5, the respective pointers 11 and 12 are formed of polarized material that is longitudinally slotted as indicated at 47. This type of pointer is employed when the cross pointer reference lines 16 and 17 are graduated to indicate the approximate linear displacement of the craft from the path.

Preferably, the rear of the element 13 may be frosted to create the impression that the observer is looking into the instrument instead of looking at it. The rod 44 is preferably formed of "Lucite" material.

Means are also included in the improved meter to enable the pilot to observe the air speed of the craft in relation to a controllable reference. The illustrated type of air speed indicator shown in Figs. 1, 2, 3 and 4 includes a movable index 49 formed of two vertically spaced pieces mounted on a vertically positioned movable arm 50. Arm 50 slides in a channel piece 51 fixed to the cover plate 52. A pin 53 on the arm 50 engages the slotted end of a lever 54 that is pivoted at 55. A pin 56 at the other end of the lever extends through a slot 57 in the front wall of the housing 10. A settable knob 58 is situated on the pin 56 which includes an index piece 59 extending therefrom that cooperates with a scale 60 on the outside of the housing, the scale being graduated in accordance with air speed. The operator manually sets the knob 58 so that the index 49 within the housing assumes a position corresponding to the desired air speed of the craft as determined by the scale 60. As shown in Fig. 2, the index is situated in an open area between the reflector 20 and the rear of the element 13. A movable reference 61 is provided for the index and an air speed responsive means is employed to position the reference. When the parts are positioned as shown in Fig. 1, the actual air speed of the craft corresponds with the desired speed of the craft as determined by the pilot in setting the index 49.

The air speed responsive means is schematically shown in connection with Fig. 2, the same being generally designated at 62. As illustrated, this unit includes a pitot tube controlled bellows 63 that positions the shaft 64 of the rotor of a selsyn transmitter 65 by way of rack and pinion connection 66 and the meshed gears 67. The selsyn receiver 68 for the output of the transmitter is situated on the cover plate 52, the rotor thereof positioning shaft 69 which in turn locates the vertical slidable arm 70 of the reference 61 through rack and pinion connection 71. The selsyn system is similar to that shown in Fig. 6, shaft 69 repeating the position of shaft 64 to consequently determine the position of the reference 61 of the air speed indicator of the instrument. A frosted plate 72 may be fixed to the front of the reflector 20 when the air speed indicator is employed in the instrument.

A rate of climb meter generally indicated at 73 of a similar character to air speed controller 62 is responsive to the vertical component of the speed of the craft. The selsyn transmitter 74 is effective to control the receiver 68 to position the reference 61 of the cross pointer meter. The manually settable index 49 is positioned with respect to an auxiliary scale 75 when the aircraft is descending. A switch 76 under control of the pilot enables the desired one of the reference 61 positioning controls to be utilized at the proper time.

It is obvious that if the element 13 referred to as a "background element" is of amber or other translucent material, this element, while illustrated as between the crossed pointers 11 and 12 and the reference 61, is not limited to this position with respect to the crossed pointers and the reference 61.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A cross pointer meter for dirigible craft including a casing, a movable pair of crossed pointers in said casing, means for positioning the pointers in accordance with displacement of the craft from a desired path, a pivotally mounted background element providing a reference scale for said crossed pointers, and means for turning said background element about its axis of pivotal mounting relative to said casing as the craft moves about its roll axis.

2. A cross pointer meter for dirigible craft including a casing, a movable pair of crossed pointers in said casing, means for positioning the pointers in accordance with the displacement of the craft from a desired path, a background element providing a reference scale for the crossed pointers and mounted for pivotal movement in said casing about a fore and aft axis relative to said craft, and means for stabilizing said background element as said craft rolls about its roll axis.

3. A cross pointer meter for dirigible craft including a casing having a bank indicating reference fixed thereon, a movable pair of crossed pointers in said casing, means for positioning the pointers in accordance with the displacement of the craft from a desired path, a background element providing horizontal and vertical reference scales for the crossed pointers and providing an index for the bank indicating reference on the casing, means for pivotally mounting said element in said casing for movement about a fore and aft axis relative to the craft, and means for stabilizing said element as said craft rolls about its roll axis.

4. A meter of the character claimed in claim 3, in which said stabilizing means includes a gyro vertical and an electrical position repeating device having a transmitter situated at the roll axis of the gyro vertical and a receiver at the axis of the background element.

5. A meter of the character claimed in claim 3, in which the background element is a spherical segment having equal sections of different degrees of transparency divided along a normally horizontal plane to define the bank index thereon, and said casing includes means for illuminating said background element.

6. An instrument landing meter for aircraft, comprising an instrument casing mountable in said aircraft, a background element having scale divisions along horizontal and vertical coordinate axes, means responsive to displacement of said aircraft from a predetermined landing path and cooperative with said element to indicate the position of said aircraft relative to said path, and means responsive to rolling motion of said aircraft for pivoting said element relative to said casing about a fore and aft axis of said aircraft, thereby to stabilize said element about said axis.

7. A cross pointer meter including a casing, a movable pair of crossed pointers in said casing, spring and coil means for deflecting each of said pointers to an extent varying as the strength of an applied signal, a movable background element so positioned in said instrument as to appear in juxtaposition with said crossed pointers and provide a reference scale therefor, and signal-responsive means for varying the position of said background element.

8. A cross pointer meter including a casing, a movable pair of crossed pointers in said casing, elastance-opposed electromagnetic means for deflecting said pointers in accordance with applied signal strength, a movable background element providing a positional reference for said pointers, and signal-responsive means for varying the position of said background element.

9. A meter as defined in claim 8, wherein said signal-responsive means for varying the position of said background element comprises a positional repeater means for stabilizing said background element in response to a remote-indicating stable reference device.

10. An indicating instrument including a casing, a movable pointer in said casing, spring-opposed electromagnetic coil means for deflecting said pointer in accordance with the strength of an applied signal, a movable background element providing a positional reference for said pointer, and self-synchronous positional repeater means for maintaining said background element oriented according to the orientation of a remote control device.

11. An indicating instrument including a casing, a movable pointer in said casing, coil means for positioning said pointer in accordance with an applied signal, a background element pivoted for rotation about an axis and so positioned in said instrument as to appear in juxtaposition with said pointer, and gyroscopic stable reference means for varying the position of said background element about said axis of rotation.

12. A cross pointer meter including a casing, a spherical surface element pivoted in said casing for rotation about an axis passing through the center of sphericity of said element, a movable pair of crossed pointers in said casing pivoted about mutually perpendicular axes passing substantially through the center of sphericity of said element and perpendicular to the axis of rotation of said element, elastance-opposed signal-responsive means for deflecting said pointers, and further signal-responsive means for positioning said element about said first axis of rotation.

13. A cross pointer meter for dirigible craft capable of simultaneously indicating attitude and position of the craft, comprising a casing, a movable pair of crossed pointers in said casing, electric signal responsive motive means for deflecting said pointers, whereby each of said pointers is adapted to be controlled by a radio navigation system voltage, a background element movably supported in said casing and providing a positional reference for said pointers, and means for stabilizing said background element against rotation about at least one axis, whereby said element is enabled simultaneously to permit an operator of the craft to gauge the craft displacement from a predetermined navigation path and to maintain a desired attitude of the craft without reference to other instruments.

FREDERIC A. JENKS.

REFERENCES CITED

The following references are of record in the file of this patent:

UNITED STATES PATENTS

| Number | Name | Date |
| --- | --- | --- |
| 1,267,633 | Clift | May 28, 1918 |
| 1,786,841 | Gilbert | Dec. 30, 1930 |
| 2,119,530 | Dunmore | June 7, 1938 |
| 1,809,525 | Moran | June 9, 1931 |
| 2,044,151 | Sperry et al. | June 16, 1936 |
| 2,190,977 | Penott | Feb. 20, 1940 |
| 2,278,641 | Bond | Apr. 7, 1942 |
| 2,262,033 | Moseley | Nov. 11, 1941 |
| 2,264,726 | Stickney | Dec. 2, 1941 |
| 1,935,740 | Gette | Nov. 21, 1933 |

FOREIGN PATENTS

| Number | Country | Date |
| --- | --- | --- |
| 145,460 | Great Britain | Oct. 18, 1921 |